US005165333A

United States Patent [19]
Ratzlaff et al.

[11] Patent Number: 5,165,333
[45] Date of Patent: Nov. 24, 1992

[54] ROUND BALER HAVING ANTI-WRAPPING IDLER ROLLS

[75] Inventors: Howard J. Ratzlaff, Hesston; Ferol S. Fell, Newton, both of Kans.

[73] Assignee: Hay & Forage Industries, Hesston, Kans.

[21] Appl. No.: 811,076

[22] Filed: Dec. 20, 1991

[51] Int. Cl.⁵ .............................................. B30B 5/06
[52] U.S. Cl. ........................................ 100/88; 56/341; 198/817
[58] Field of Search ............... 100/5, 88; 53/118, 587; 56/341; 198/817, 842, 843

[56] References Cited
U.S. PATENT DOCUMENTS

| | | | |
|---|---|---|---|
| 407,724 | 7/1889 | Davis | 198/817 X |
| 1,050,400 | 1/1913 | Steele | 198/817 |
| 4,182,101 | 1/1980 | Gaeddert et al. | 100/88 X |
| 4,302,002 | 11/1981 | Hashimoto | 198/817 X |
| 4,428,282 | 1/1984 | Anstey | 100/88 |
| 4,444,098 | 4/1984 | Soteropulos | 100/88 |
| 4,470,591 | 9/1984 | Acquaviva | 198/817 X |
| 5,097,760 | 3/1992 | Ratzlaff et al. | 100/88 |

Primary Examiner—Harvey C. Hornsby
Assistant Examiner—Stephen F. Gerrity
Attorney, Agent, or Firm—Hovey, Williams, Timmons & Collins

[57] ABSTRACT

An idler roll in a round baler has a number of belt-engaging portions spaced along its length, certain of which portions are of larger diameter than others so that the belts which wrap around the roll and are driven at a constant speed by other mechanism in the baler have a tendency to slip on some of the surfaces due to differences in peripheral speeds of such surfaces, which aids in maintaining the rolls polished and trash-free. A second idler roll has its own set of spaced, enlarged diameter portions, such portions on the second roll being in staggered relationship to those on the first roll so that the net differential in belt tension around the areas of large and small diameter is zero.

19 Claims, 3 Drawing Sheets

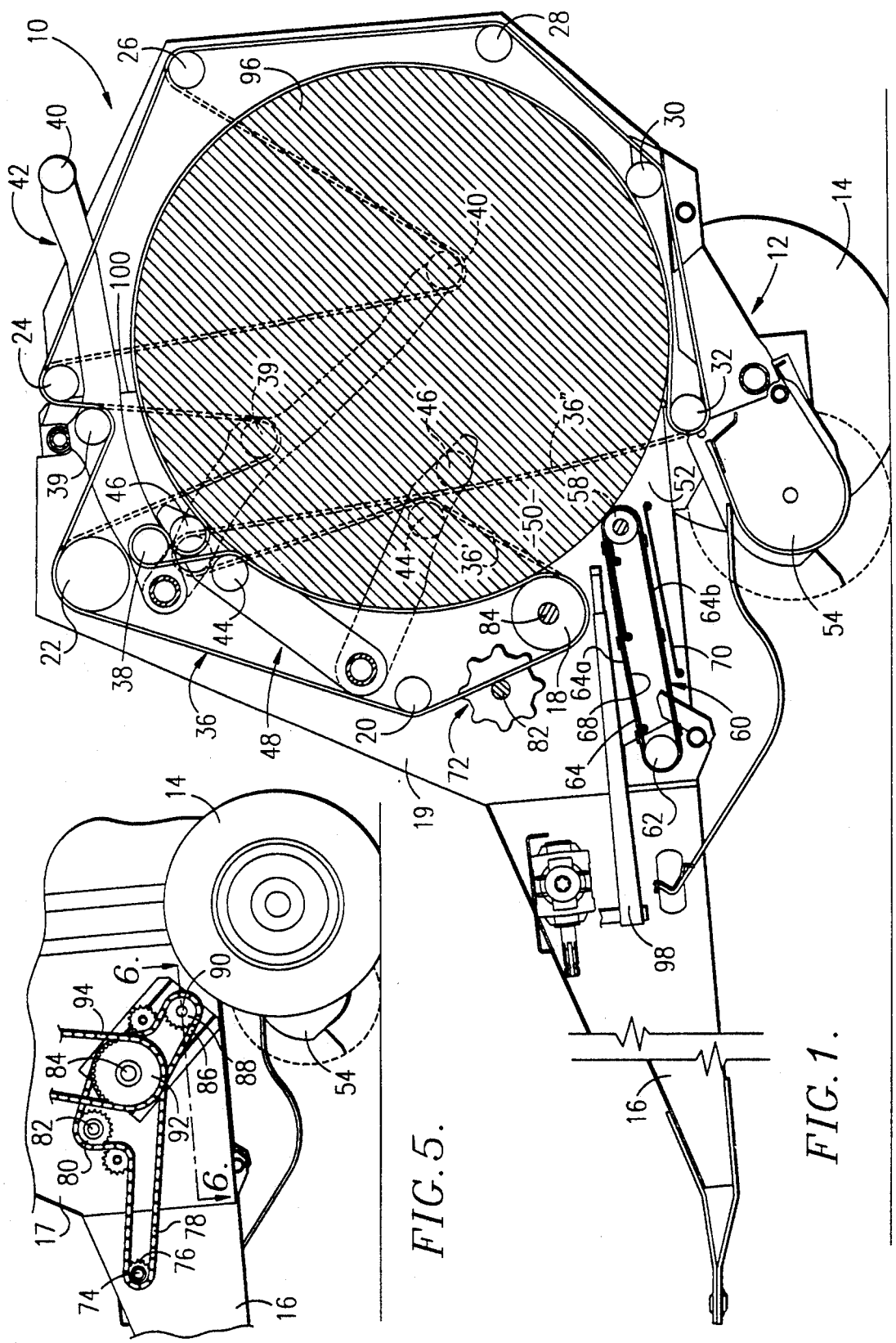

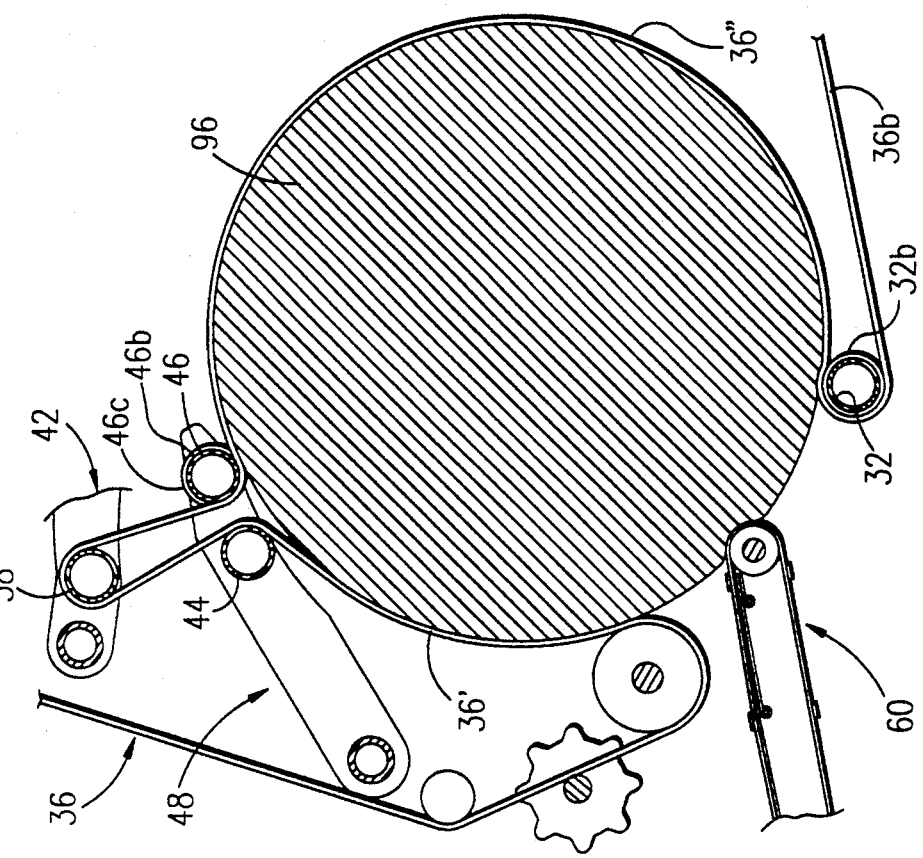
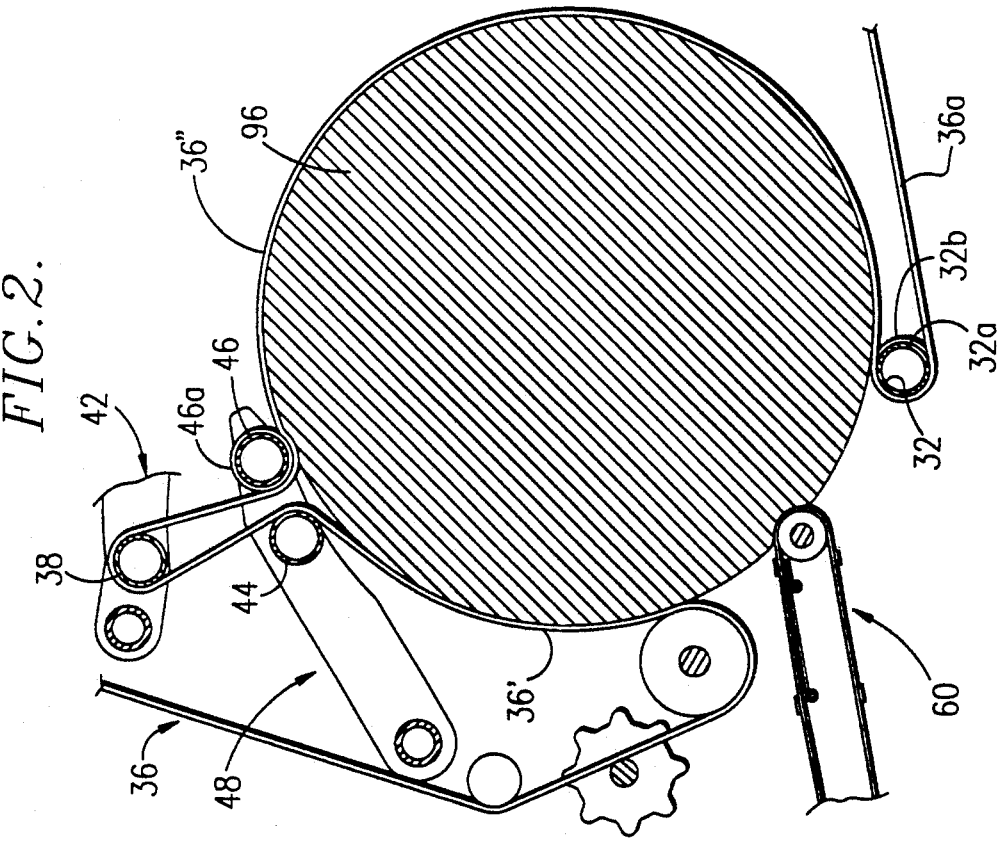

ROUND BALER HAVING ANTI-WRAPPING IDLER ROLLS

TECHNICAL FIELD

This invention relates to round balers and, more particularly, to a novel construction for the belt idler rolls of such balers to discourage the wrapping and accumulation of crop materials on the idler rolls during bale-forming operations.

BACKGROUND

Round balers which are variously known as expandable chamber or variable volume type balers typically utilize cooperating sets of endless, flexible belts to form the baling chamber within the machine and to compress and roll the crop material into a bale as it is introduced into the chamber. These belts are driven longitudinally by one or more drive rolls and are also guided in their driven movement by a multitude of transverse idler rolls. The idler rolls are journaled by anti-friction bearings so that they rotate freely due to their engagement with the longitudinally driven belts, thus reducing frictional wear between the belts and the surfaces of the guide rolls. However, it has been found that when the belts and the idler rolls are moving together at the same velocities in this manner, there is a tendency for the rolls to wrap up with loose trash and stringy materials, causing plugging problems and other difficulties. From time-to-time the plugged and wrapped materials must be cleaned out of the machine to prevent malfunction and damage.

SUMMARY OF THE PRESENT INVENTION

Accordingly, one important object of the present invention is to provide for a certain amount of limited slippage between the idler rolls and the belts which drive the rolls so that the roll surfaces underneath the belts are subjected to a slight abrading or scuffing action to maintain the roll surfaces in a polished, trash-free condition. Pursuant to this object, the present invention contemplates having the series of belt-engaging surfaces along at least certain of the idler rolls constructed of different diameters so that some of the belts on a roll engage and wrap around larger diameter portions while others engage and wrap around smaller diameter portions. Inasmuch as all of the belts are driven at the same speed by a common drive source in the machine, the rotational speed of the idler roll will be determined by those belts which engage the smallest diameter portions of the idler roll, assuming all belts are equally tensioned. Consequently, the periphery of each larger diameter portion of the idler roll is caused to move at a faster velocity than the belt which engages it, resulting in slight slippage and a consequential polishing action.

On the other hand, if the belts happen to be somewhat loose around the smaller diameter portions and tight around the larger diameter portions, the roll speed is controlled during such time by the larger diameter portions. This produces slippage at the smaller diameter portions instead of the large portions. In practice, it has been found that the tension tends to constantly vary somewhat from belt-to-belt throughout the bale-forming process because the bale surface is not always kept at a uniform diameter along its length. Therefore, which of the belts is experiencing the slippage is constantly changing throughout the baling process.

Those belts which move around the larger diameter portions have slightly greater distances to travel than the belts moving around the smaller diameter portions. Therefore, the belts around the larger diameter portions pull out slightly more slack from the slack control device that is common to all of the belts, thus also paying out additional slack to even those belts around the lesser diameter portions which do not need the extra slack. This imbalance is rectified, however, by providing a complemental, staggered set of larger diameter portions and smaller diameter portions on a neighboring idler roll so that the neighboring roll has its lesser diameter portions aligned with the larger diameter portions of the other idler roll, and vice versa, thereby resulting in a zero net tension differential between the belts. In its preferred form, each area of enlargement on each of the selected idler rolls is accomplished by a steel collar that underlies the selected belt, which collar is slightly narrower than the width of the belt itself so that the belt overhangs the collar at opposite ends of the collar.

BRIEF DESCRIPTION OF THE DRAWINGS

FIG. 1 is a vertical cross-sectional view of a baler of the type which may be provided with idler rolls constructed in accordance with the principles of the present invention, the near sidewall of the baler being removed to reveal internal details of construction;

FIG. 2 is a fragmentary cross-sectional view of the baler, but wherein two of the idler rolls have been provided with special collars in accordance with the present invention, the section line being taken at a belt which wraps under a collar on one of the overhead retaining idler rolls and around a reduced diameter portion on the lower tailgate roller;

FIG. 3 is a fragmentary cross-sectional view similar to FIG. 2, but taken at a different belt than shown in FIG. 2 to illustrate the belt of FIG. 3 looped under a reduced diameter portion on the upper retaining idler roll and around an enlargement collar on the lower tailgate roller;

FIG. 5 is a fragmentary, left side elevation view of the baler illustrating the drives for various components of the machine.

DETAILED DESCRIPTION

Figure 4:
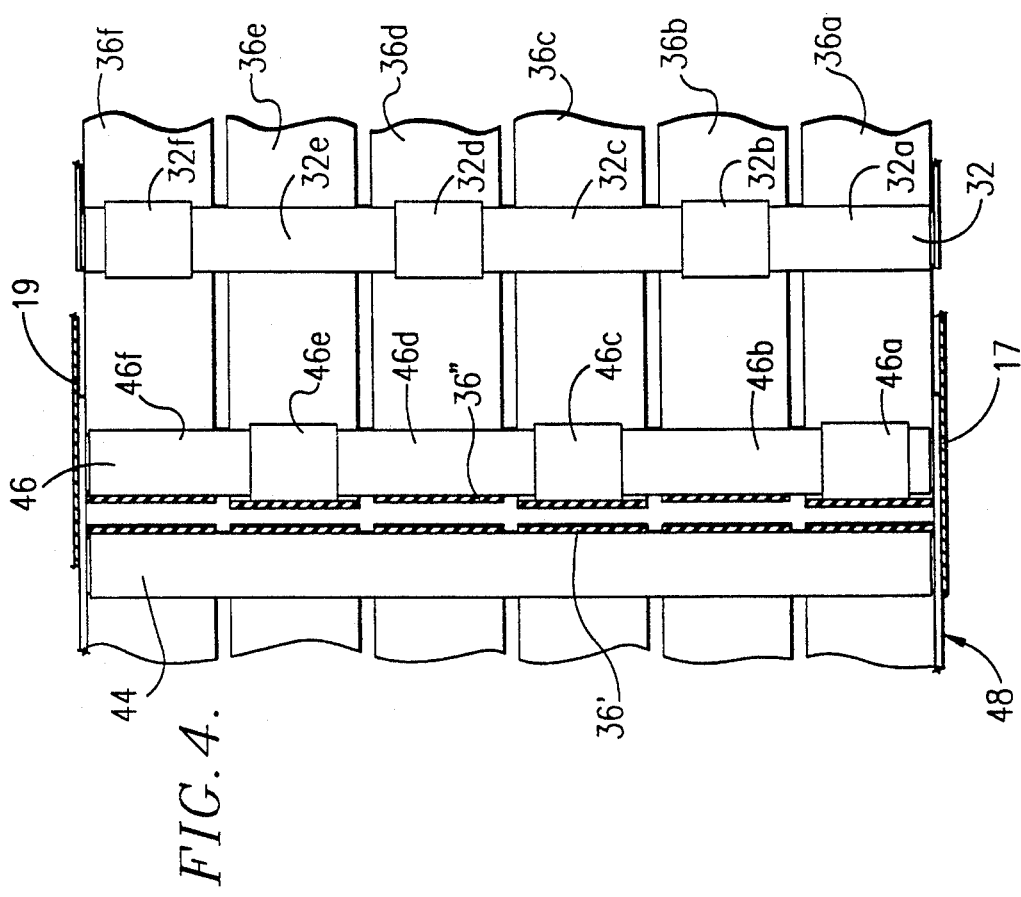
FIG. 4 is an enlarged, fragmentary generally horizontal cross-sectional view through the baler when the bale chamber is empty and the retaining rolls are in their full down position, as illustrated in phantom lines in FIG. 1, such horizontal view being taken along a line slightly above the retaining rolls and looking downwardly into the baler from that position to illustrate the staggered relationship between the enlargement collars on the neighboring idler rolls.

The round baler 10 selected for illustration includes a wheeled chassis 12 having ground wheels 14 and a forwardly extending tongue 16 that is adapted for connection with a towing vehicle (not shown). The chassis 12 carries a pair of upright, laterally spaced sidewalls 17 and 19 which cooperate to define a space within which bale forming and bale wrapping operations may be carried out as the baler is advanced across a field.

The variable chamber baler 10 includes a series of cooperating belts and rolls supported by the sidewalls 17,19 for compacting and rolling the bale as it forms within the machine. In this respect, the baler 10 is provided with a plurality of stationary rolls 18,20,22, 24,26,28,30, and 32 which span the sidewalls 17,19 in a general circular pattern viewing FIG. 1 for guiding a plurality of endless, side-by-side belts 36 as the belts 36 are driven linearly during bale formation and wrapping. A set of three movable slack takeup rolls 38,39, and 40 are mounted near the upper portion of the baler on downwardly spring biased arm structure 42 to maintain tension on the belts 36, yet permit the paying out of stored slack as the bale increases in diameter during formation. Near the fore-and-aft center of the baler 10, the belts 36 are looped under the roll 18, over the takeup roll 38, and under the lower roll 32 to present a pair of opposed, front and rear runs 36a and 36b which are initially generally upright, as illustrated in phantom in FIG. 1 but which become bowed out in fore-and-aft directions, as illustrated in solid lines in FIG. 1, as the bale grows beyond its initial starting core dimensions. A pair of retaining rolls 44 and 46 are mounted on a second swingable arm structure 48 that is also spring-biased downwardly toward the phantom line position in FIG. 1, the retaining rolls 44,46 receiving the belt runs 36a and 36b therebetween so as to form a baling chamber 50 between the runs 36a,36b which is bounded at the sides by the sidewalls 17,19.

Initially, the chamber 50 assumes a generally upright, somewhat triangular configuration, as shown in phantom lines in FIG. 1, with the retaining rollers 44,46 at the apex of the chamber 50. Thereafter, the chamber 50 becomes distended and circular in transverse configuration as the growing bale pushes forwardly on the belt run 36a and rearwardly on the belt run 36b to cause additional slack to be paid out when the arm 48 rises as additional hay is progressively added to the bale.

The chamber 50 is open at the bottom to present an infeed region 52 that is generally defined between the lower roll 32 and the upwardly and forwardly disposed roll 18. A pickup 54 supported generally below the infeed region 52 and forwardly adjacent the roll 32 is operable to lift crop material off the field as the baler 10 is advanced and to feed the material into the chamber 50 through the infeed region 52. Although not shown in the drawings, it will be understood that additional infeed means in the form of ribbed rollers or other devices between pickup 54 and roll 32 could be provided to assist the pickup 54 in feeding materials into chamber 50.

The roll 18 and the roll 22 are drive rolls for the belts 36 and are driven in clockwise directions viewing FIG. 1. Thus, when the baling chamber 50 is in its initial upright condition, as shown in phantom in FIG. 1, the front run 36a is moving generally downwardly and forwardly while the rear run 36b is moving generally upwardly and slightly forwardly. Consequently, hay introduced into the chamber 50 via the infeed region 52 is acted upon by the upwardly moving rear run 36b and the downwardly moving front run 36a so as to tumble forwardly and coil into a core.

Assisting in the formation of the core is a transverse starter roller 58 in the infeed region 52 which forms part of a conveyor assembly 60 above the pickup 54 and below the roll 18. The starter roller 58 is in many respects similar to the bale positioning roller 134 shown in U.S. Pat. No. 4,182,101 assigned to the assignee of the present invention. However, whereas the starter roller 134 of U.S. Pat. No. 4,182,101 is isolated and alone within the infeed region of the baler, the starter roller 58 in the baler 10 has additional structure associated with it, i.e., the other components of the conveyor assembly 60, so as to keep the starter roller 58 from wrapping with crop material during operation.

Figure 6:
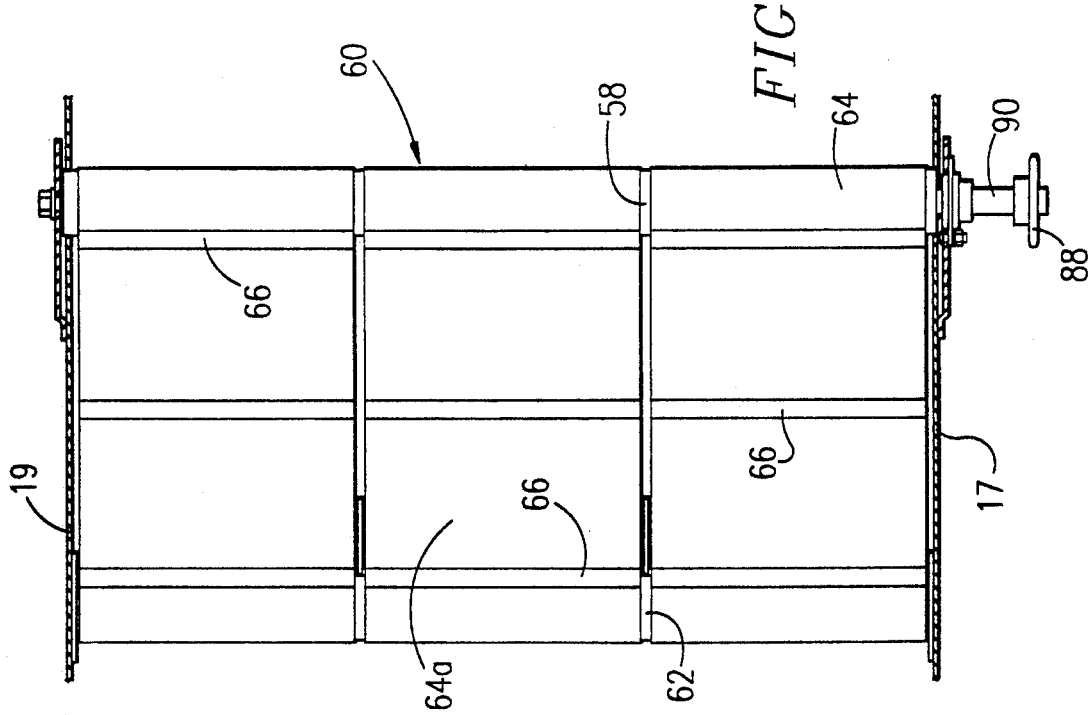
FIG. 6 is an enlarged, fragmentary generally horizontal cross-sectional view taken substantially along line 6—6 of FIG. 5.

As illustrated in the drawings, the starter roller 58 is positioned within the infeed region 52 approximately midway between the lower roll 32 and the upwardly and forwardly spaced roll 18. In this position, the starter roller 58 presents the inner or rear end of the conveyor assembly 60, while the opposite or front end of the conveyor assembly 60 is presented by a second transverse roller 62. Entraining the two rollers 58 and 62 is an endless web defined by three side-by-side, endless, flexible belts 64 as illustrated in FIG. 6, such belts 64 having an upper stretch 64a moving inwardly toward the infeed region 52 and a lower stretch 64b moving outwardly away from the infeed region 52. Preferably, each of the belts 64 has a plurality of transverse slats 66 thereon which are positioned at equally spaced intervals along the length of the belt 64. Immediately below the upper stretch 64a of the belts 64 is a pan 68 (FIGS. 1) which extends in a fore-and-aft direction substantially the entire distance between the starter roller 58 and the front roller 62 while spanning the entire transverse width of the baler 10 for the purpose of catching residue and other trash materials that might fall between the belts 64 of the conveyor 60. A plate-like shield 70 underneath the lower stretch 64b of the belts 64 extends the full transverse width of the baler and prevents infeeding hay on the pickup 54 from coming into contact with the outwardly moving lower belt stretch 64b.

During the formation of a bale, a small amount of hay may be sloughed off the bale due to slippage between the belts 36 and the surface of the bale. Some of that residue tends to collect within the open area immediately above the roll 18 in front of the front belt run 36a. However, such accumulating material is immediately discharged from that area by the action of clean out discs broadly denoted by the numeral 72 which protrude into the collecting area and have their protruding portions moving downwardly in a direction opposite to that of the upwardly moving belts 36 in the immediate vicinity. Such clean out discs 72 are the subject of co-pending application Ser. No. 07/626,973 filed Dec. 13, 1990, (now U.S. Pat. No. 5,097,760) in the names of Howard J. Ratzlaff, et al., and assigned to the assignee of the present invention.

FIG. 5 illustrates the means by which drive roll 18, conveyor assembly 60, clean out discs 72 and starter roller 58 receive their driving power. It will be seen in this respect that input power to such mechanisms is provided by a jack shaft 74 situated at the rear of the tongue 16 which is connected through a drive line (not shown) to the power take off shaft of the towing vehicle. The jack shaft 74 carries a small sprocket 76 that is entrained by an endless, generally fore-and-aft extending chain 78. The chain 78 also wraps around a sprocket 80 on a shaft 82 of the clean out discs 72 and further entrains a large sprocket (not shown) carried by a stub shaft 84 of the drive roll 18. A second large sprocket (also not shown) on the stub shaft 84 is entrained by a second drive chain 86 that extends rearwardly from the stub shaft 84 to entrain a sprocket 88 on the outer end of a shaft 90 associated with the starter roller 58. On the outermost end of the stub shaft 84 is disposed a third large sprocket 92 which is entrained by a generally vertically extending endless drive chain 94 leading upwardly to the upper roll 22 for supplying driving power to the latter.

In accordance with the present invention, the two idler rolls 32 and 46 are specially constructed to discourage the wrapping of such rollers with strands of loose crop materials. As shown particularly in FIGS. 2, 3 and 4, the rollers 32 and 46 have a plurality of longitudinally spaced belt-engaging portions 32a-f and 46a-f, respectively, along their lengths which are engaged by the belts 36a-f during the bale forming process. In the case of the idler roll 32, the portions 32b, 32d, and 32f are of slightly increased diameter relative to the remaining portions 32a, 32c, and 32e. All three of the enlarged portions 32b, 32d, and 32f are of the same diameter and may be conveniently presented by steel collars which are welded onto the otherwise uniform diameter roller 32 such that the lesser diameter portions 32a, 32c, 32e are also of one common diameter. It will be noted that the larger diameter collars 32b, 32d, and 32f are narrower than their respective entraining belts 36b, 36d, and 36f so that those belts overlap and overhang the opposite extremities of the collars 32b, 32d, and 32f.

The idler roll 46 is of similar construction to the idler roll 32, except that the enlarged collars 46a, 46c, and 46e along the idler roll 46 are staggered or offset with respect to the collars 32b, 32d, and 32f along the roll 32. Thus, as illustrated in FIG. 4, the collars 46a, 46c, and 46e are aligned in the direction of belt travel with the reduced diameter portions 32a, 32c, and 32e of the roll 32. On the other hand, the smaller diameter portions 46b, 46d, and 46f of the idler roll 46 are aligned with respect to the direction of belt travel with the enlarged collars 32b, 32d, and 32f of the roll 32. The collars 32b, 32d, and 32f of the roll 32 are of the same diameter as the collars 46a, 46c, and 46e of the roll 46. Similarly, the lesser diameter portions 32a, 32c, and 32e of the roll 32 are the same diameter as the lesser diameter portions 46b, 46d, and 46f of the roll 46.

Operation

At the beginning of the baling cycle, the incoming crop materials are engaged by the upwardly moving belt run 36" and the downwardly moving front belt run 36' and are caused to coil and tumble within the baling chamber 50. The core which results from this action tends to rest upon the inner end of the conveyor assembly 60, and because the starter roller 58 is rotating in a clockwise direction, the inner end of the conveyor 60 helps impart a coiling action to the core at this time. Inasmuch as the upper belt stretch 64a approaches the periphery of the starter roller 58 in a tangential manner along the top thereof, there is no opportunity for the loose strands of hay to wedge down between the starter roller 58 and the drive roll 18. Instead, access to that area is denied by the upper belt stretch 64a. Moreover, any material that does come to rest on the upper belt stretch 64a is immediately conveyed into the baling chamber 50 to be added to the rest of the core.

As the bale grows larger and the belt runs 36' and 36" are deflected away from their upright positions, the incoming crop materials flow more directly rearwardly into a nip formed at the bottom of the bale with the underlying bottom roll 32. A representation of a full size bale is denoted by cross hatching in FIGS. 1, 2, and 3 and is designated by the numeral 96. It will be seen that the incoming hay is thus no longer presented up into the area above the starter roller 58 where it has a tendency to attempt to wrap on the roller 58 during the early stages of bale formation. Thus, to a certain extent, the conveyor 60 is of less importance in the latter stages of bale growth than in the initial core starting stage thereof. On the other hand, it will also be appreciated that because the upper stretch 64a of the conveyor assembly 60 projects forwardly beyond the drive roll 18, and particularly beyond the clean out discs 72, any stray material that is cleaned out of the accumulating area above the roll 18 will fall onto the upper belt stretch 64a and be fed directly into the chamber 50 for addition to the forming bale. Thus, even in the later stages of bale growth, the conveyor 60 and the starter roller 58 have a significant role to play.

Once the bale 96 is fully formed, it may be tightly wrapped with either twine or a web-type wrapping material, such as a net material currently available from Exxon Chemical Company under the trade designation "Bale Lok" net wrap. A swingable twine dispensing tube 98 is also provided adjacent the front of the baler and projects rearwardly into the space between the conveyor assembly 60 and the drive roll 18 for dispensing a supply of twine to the bale 96 in the event twine is desired as a wrapping material instead of the net wrap. If the net wrap is to be utilized, the baler 10 may be provided with a suitable net wrap attachment (not shown). One such suitable net wrap attachment is disclosed in co-pending application Ser. No. 07/772,238, filed Oct. 7, 1991, in the names of Ratzlaff, et al., assigned to the assignee of the present invention. After the bale is fully wrapped with either string or web material, the rear section of the machine along a parting line 100 may be swung upwardly and rearwardly to open the bale chamber and discharge the finished bale.

During the bale forming process, those idler rolls most likely to become wrapped with crop residue seem to be the idlers in the positions of the idlers 32 and 46. However, in the present invention the idlers 32 and 46 are specifically designed to avoid such wrapping problems through the use of the different diameter portions along the length of each of the rolls 32 and 46.

Taking the roll 32 as a example, it will be understood that all of the belts 36a through 36f are advancing at the same linear speed as a result of their being wrapped around the uniform diameter drive roll 18 and the similarly uniform diameter drive roll 22. Assuming for the moment that the tension in all of the belts 36a-36f is the same, the roll 32 would tend to be driven at the speed determined by its smaller diameter portions 32a, 32c, and 32e. This means that the peripheral surfaces of the larger diameter portions 32b, 32d, and 32f will be moving at a slightly faster speed than their corresponding belts 36b, 36d, and 36f so that slippage will occur at those locations. Such slippage tends to polish the steel collars and keep them free of tacky juices and dirt which otherwise tend to provide an adhering surface for stringy lengths of the crop material.

In actual practice, as the bale grows, it is not of uniform diameter throughout its length. Consequently, the belts 36 are not all uniformly tensioned during the baling process. This is due to the fact that instead of the belts being independently responsive to the particular diameter of the bale at the portion being engaged by a certain belt, all of the belts are tensioned by a common slack payout and tensioner assembly in the form of the arm assembly 42 and its rollers 39 and 40. This assembly responds to the largest diameter of any portion on the bale such that the belt corresponding to such enlarged bale area will be tight, but other belts will receive more than their necessary amount of slack length and may consequently be somewhat loose around the idler rollers 32 and 46. The increased diameter portions 32b, 32d, and 32f, however, inherently take up a measure of that slack due to their increased circumference such that while the belts along those enlarged portions might otherwise be somewhat slack, in actual practice they may at times be tight. This causes the larger diameter portions 32b, 32d, and 32f of the roll 32 to control the rotational speed of the roll 32, hence making the slippage actually occur under the smaller diameter portions 32a, 32c, and 32e.

Thus, in actual practice, there is a continual and dynamic change in the slippage that occurs along the length of the idler roll 32. At certain times the slippage may be between the large diameter portions 32b, 32d, and 34f and their corresponding belts 36b, 36d, and 36f. At other times, the slippage may be between the smaller diameter portions 32a, 32c, and 32e and their corresponding belts 36a, 36c, and 36e. Consequently, the entire length of the idler roll 32 is kept polished and clean to prevent the accumulation of a tacky, rough surface and the attraction of stringy and leafy material which necessarily results from that condition.

The use of enlargement collars on a second idler roll, namely the idler roll 46, in staggered relationship with the enlargement portions on the idler roll 32, causes a uniform tension in the belts to exist at least during the time the chamber is empty, and during the time that the bale is uniform in diameter along its full length. Thus, while there might tend to be a measure of slack under the small diameter portion 32a of roll 32, the smaller circumference of the roll 32 in that area is made up for by the larger circumference inherent in the larger diameter portion 46a of the roll 46. This cooperative, paired slack takeup action is true of the remaining staggered portions of the rolls 32,46 as well, i.e., portions 32b, 46b; 32c and 46c; 32d and 46d; 32e and 46e; and 32f and 46f. As with the roll 32, there is a dynamic shifting back and forth all along the length of the roll 46 of the portions responsible for being in driving engagement with their belts, such that slippage and self-cleaning action occurs some of the time at the enlarged portions 46a, 46c, and 46e, and at other times at the smaller diameter portions 46b, 46d, and 46f.

In practice, it has been found that radius differences as small as one-eighth inch between the enlargement portions and the lesser diameter portions of the rolls yields an effective result. It has also been found that the self-cleaning action is effective when the lesser diameter portions of the rolls and the enlarged diameter portions are all constructed from steel. Depending upon the method of manufacture, however, there may be some reliability problems in the steel rolls and steel collars, particularly if the collars are welded onto the rolls. In some instances, weld failures can occur. Theoretically, however, the rolls could be machined to produce the areas of large and small diameter portions in accordance with the present invention.

Another alternative is to produce the enlarged portions from a suitable polyurethane material that is molded onto the smaller, constant diameter shaft. In that instance, the urethane material selected for use should preferably have a coefficient of friction no greater than that of steel, and preferably less, so that the enlargement portions will not always be the dominant portions of the rolls for being driven by the belts.

Reference is hereby made to applications filed concurrently with the present application and concerning the handling of stray-crop materials and residue in round balers. Ser. No. 07/811,017 in the name of J. Dale Anderson, entitled "Residue Reducing Belt Roller Construction for Round Balers", relates to a round baler which utilizes an improved belt roller construction to reduce trash accumulation on the belt roller, while Ser. No. 07/772,238 in the names of Howard J. Ratzlaff, et al., entitled "Round Baler Having Anti-Wrapping Core Starter", relates to a round baler provided with a starter roller which is part of a conveyor belt assembly, as in the conveyor assembly 60 described herein. The inventions of these two above-identified applications form no part of the invention claimed in the present application and are identified solely for purposes of providing full disclosure of generally related subject matters.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler having a plurality of elongated, side-by-side, flexible, bale-forming belts driven in a longitudinal direction at substantially the same speed during bale formation and guided in their driven movement by at least one transversely extending, freely rotatable idler roll around which the belts are looped in engagement with the roll, the improvement comprising:
    said roll having a plurality of axially spaced portions along the length thereof underlying respective ones of said belts,
    at least one of said portions associated with one of the belts having a larger effective diameter than another of said portions associated with another of said belts whereby to cause slippage between the roll and the belts to inhibit the wrapping of crop materials around the roll.

2. In a round baler as claimed in claim 1,
    said one portion of the roll having a collar fixed thereto to present said larger effective diameter of the one portion.

3. In a round baler as claimed in claim 2,
    said roll and said collar being constructed from metal.

4. In a round baler as claimed in claim 2,
    said collar being narrower than the belt associated with the collar to permit the associated belt to overhang opposite ends of the collar.

5. In a round baler as claimed in claim 1,
    said roll having a said larger effective diameter portion under alternate belts along the length of the roll.

6. In a round baler as claimed in claim 5,
    all of said larger effective diameter portions being of the same diameter.

7. In a round baler as claimed in claim 6,
    all of the portions of the roll of lesser effective diameter having a common diameter.

8. In a round baler as claimed in claim 1, said baler having at least one additional transversely extending roll around which the belts are looped, said additional roll having an enlarged diameter portion underlying the belt which is looped around a portion of lesser effective diameter on the first-mentioned idler roll, said additional roll further having a portion of lesser effective diameter underlying the belt which is looped around a larger effective diameter portion on the first-mentioned idler roll.

9. In a round baler as claimed in claim 8, said additional roll being an idler roll.

10. In a round baler as claimed in claim 8, said additional roll and said first-mentioned idler roll each having a said larger effective diameter portion under alternate belts along the length of the roll.

11. In a round baler as claimed in claim 10, all of said larger effective diameter portions on both the first mentioned idler roll and the additional roll being of the same diameter.

12. In a round baler as claimed in claim 11, all of the portions of lesser effective diameter on both the first mentioned idler roll and the additional roll having a common diameter.

13. In an idler roll for use in a round baler for guiding a plurality of elongated, flexible, side-by-side, bale-forming belts driven in a longitudinal direction at substantially the same speed and in engagement with the idler roll during bale formation, the improvement comprising:

a plurality of discrete, axially spaced belt-engaging portions along the length of the roll corresponding in number and location to the number and location of said bale-forming belts to be engaged with the roll, at least one of said portions having a larger effective diameter than another of said portions for causing slippage between the roll and the belts to inhibit wrapping of the roll with crop materials during bale formation.

14. In an idler roll as claimed in claim 13, said one portion of the roll having a collar fixed thereto to present said larger effective diameter of the one portion.

15. In an idler roll as claimed in claim 14, said roll and said collar being constructed from metal.

16. In an idler roll as claimed in claim 13, said collar being narrower than the belt associated with the collar to permit the associated belt to overhang opposite ends of the collar.

17. In an idler roll as claimed in claim 13, alternate ones of the belt-engaging portions along the length of the roll having larger effective diameters than the other belt-engaging portions.

18. In an idler roll as claimed in claim 17, all of said larger effective diameter portions being of the same diameter.

19. In an idler roll as claimed in claim 18, all of the portions of the roll of lesser diameter having a common diameter.

* * * * *